Dec. 15, 1942.  E. F. MARTINEC  2,304,944
WHEEL CONSTRUCTION
Filed Dec. 28, 1940
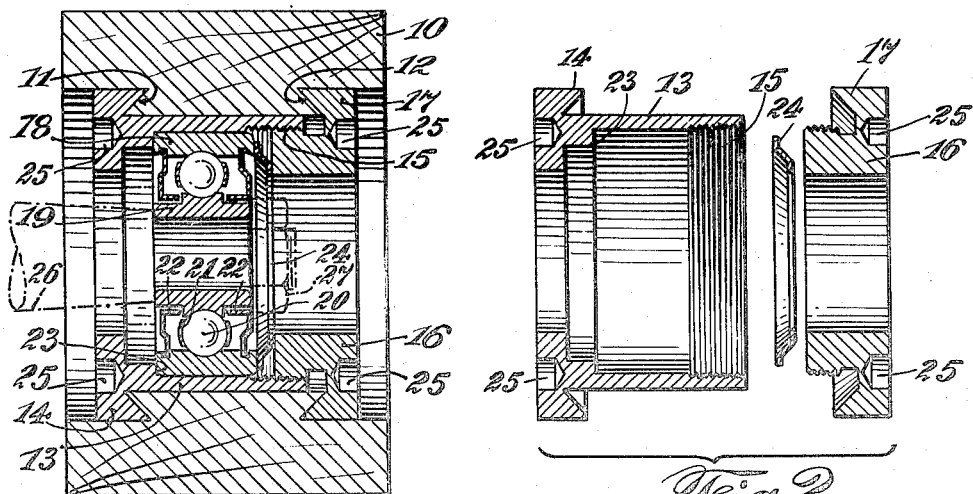
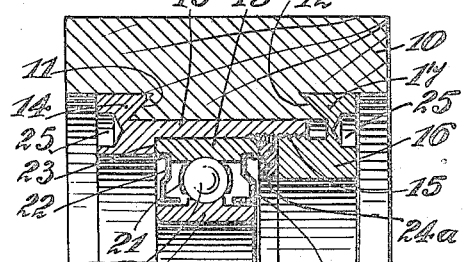
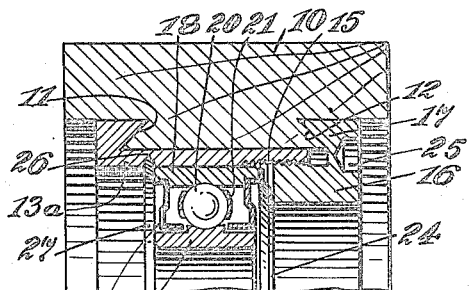
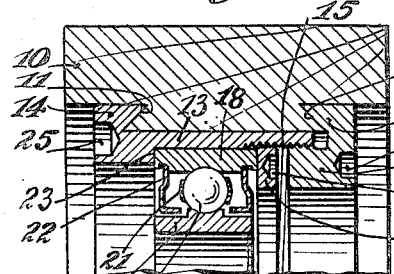
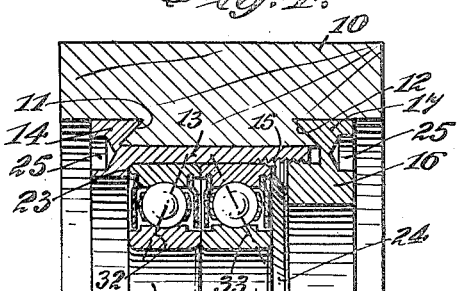
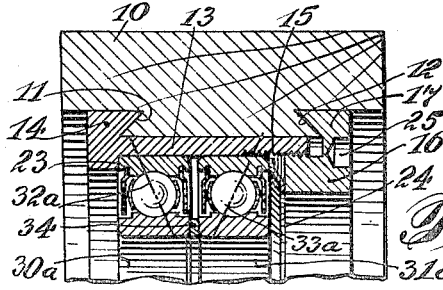
INVENTOR
Eugene F. Martinec
BY C. P. Goepel
his ATTORNEY Patented Dec. 15, 1942

2,304,944

UNITED STATES PATENT OFFICE 2,304,944

WHEEL CONSTRUCTION

Eugene F. Martinec, Cleveland, Ohio, assignor to Norma-Hoffmann Bearings Corporation, Stamford, Conn., a corporation of New York Application December 28, 1940, Serial No. 372,156

8 Claims. (Cl. 301—5.7)

This invention relates to new and useful improvements in a wheel construction, more particularly to that type of wheel used on roller skates and the like, and has for its object to provide a wheel of this character embodying precision bearings and a removable outer tire.

Roller skates for use on indoor skating rings are quite different from the ordinary roller skates such as commonly used by children for skating on the sidewalk or other paved surfaces. In the latter, the rollers are constructed of metal throughout. In the former type of skate, however, because of the extremely smooth and highly polished surfaces of indoor skating arenas, the use of metal rollers is prohibited and the wheels or rollers are usually constructed of wood, fibre or other suitable materials. It is to this latter type of wheel construction that the present invention is directed.

In the manufacture of these wheels or rollers, the outer tire of wood or other materials has heretofore been fixedly secured to the bearing structure of the wheel in order to obtain rigidity of construction. After the skates have been in use for a comparatively short time, flat portions develop on the outer rolling surface of the wheels which require frequent regrinding, or retruing, in order to maintain smoothness of operation of the skates. These frequent grindings gradually reduce the diameter of the wheels so that within a relatively short time the wheels are no longer usable, and inasmuch as the outer tire is permanently secured to the bearing structure, it then becomes necessary to replace the entire wheel assembly. Another disadvantage in the wheels heretofore used resides in the fact that a certain amount of shrinkage takes place in the outer tire of the wheel assembly with the result that the bearings or bearing mountings become loose from the outer tire and thus render the wheel useless and impractical.

It is therefore another object of the present invention to overcome the above noted disadvantages and to provide a wheel having a removable outer tire held in place on the bearing assembly by a novel clamping mechanism which is adjustable to take up any looseness occasioned by shrinkage of the materials of the tire.

Another object of the present invention is to obtain a cushioning effect by means of a flexible clamping of the bearing. This eliminates vibrations of the skate which are objectionable to the skater and absorbs shock loading to an extent that ball imprinting of the bearing raceways and undue wear, are prevented.

With the above and other objects in view which will appear as the description proceeds, the invention resides in the novel features hereinafter more fully described and illustrated in the accompanying drawing and more particularly pointed out in the appended claims.

Referring to the drawing in which numerals of like character designate similar parts throughout the several views,—

Fig. 1 is a longitudinal section through a wheel assembly constructed in accordance with the present invention;

Fig. 2 is an exploded longitudinal sectional view of the inner shell of the structure forming the bearing housing and the clamping means for the outer tire, and Figs. 3 to 8, inclusive, are fragmentary longitudinal sections of different modified forms of the invention.

In the drawing, the wheel construction illustrated in Fig. 1 comprises an outer annular tire 10 of wood or any other material suitable for use on smooth, highly polished skating surfaces. Intermediate its ends, the inner bore of the tire 10 is reduced to form a pair of annular shoulders 11 and 12 oppositely beveled inwardly toward one another.

A cylindrical sleeve 13 adapted to fit into the bore of the tire 10 is formed with an outer annular flange 14 on one end thereof, beveled to engage the complementary beveled shoulder 11 of the tire 10. The opposite end of the sleeve 13 is interiorly threaded as at 15 to receive the threaded inner end of an annular clamping nut 16 formed with a peripheral flange 17 beveled to engage the complementary beveled shoulder 12 of the tire 10.

The sleeve 13 houses a precision bearing assembly including an outer race 18, an inner race 19, and a cluster of balls 20 retained in the usual cage 21 and sealed in the race members 18 and 19 by the annular shields 22. The bearing assembly is preferably grease packed and the annular shields 22 serve to prevent the escape of the lubricant and the entrance of dust and dirt. One side of the outer race 18 of the bearing assembly engages a reduced annular abutment 23 formed in the bore of the sleeve 13, while the opposite side of the race 18 is engaged by a compression spring ring 24 interposed between the inner end of the clamping nut 16 and the bearing assembly to retain the latter in position in the sleeve 13 and to take up all play between bearing and shoulder. The spring 24 also serves to cushion the bearing assembly against vibration and shock.

Thus the sleeve 13 and clamping nut 16 with their respective beveled flanges 14 and 17 cooperate with the complementary shoulders 11 and 12 of the tire 10 to clamp the latter in place, said sleeve and clamping nut also cooperating with the precision bearing assembly to provide a self-contained wheel construction. The outer end faces of the sleeve 13 and clamping nut 16 are formed with recesses 25 to accommodate the prongs of a spanner wrench to facilitate the tightening and removal of the tire 10 as well as the bearing assembly.

As shown in dotted lines in Fig. 1, the wheel is supported on the end of a shaft 26 and locked in place thereon by the conventional nut 27.

It will thus be seen that there is provided a wheel constructed of several members but which may be quickly and easily assembled and dismantled for replacement of any worn or broken parts. Furthermore, the particular construction of the tire clamping members 13 and 16 permit of adjustment to take up any looseness brought about by shrinkage of the tire 10 and tightly lock the latter in proper position with respect to the bearing assembly.

It will also be observed from the foregoing description that the beveled flanges 14 and 17 of the clamping members 13 and 16, respectively, form a dovetailed joint with the complementary beveled shoulders 11 and 12 of the tire 10 so that in the event said tire should split, as is frequently the case due to the wood grain, said clamping members serve to hold the split parts of the tire together, thereby preventing serious injury to the skater.

It will further be observed that the spring 24 is compressed between the face of the bearing and the face of the clamping member 16 so that the outer race of the bearing 18 is held tightly against shoulder 23 regardless of the exact tire-clamping position of members 13 and 16. Moreover, the spring 24 acts to cushion the bearing assembly against vibrations and also assists in preventing ball impact in the race members occasioned by sudden dropping of the skates on the floor, for example when jumping, or strains occasioned by sudden stopping and body checking as occurs when hockey is played. In body checking or sudden stopping, one or both skates are usually turned at right angles to the line of motion so that the entire strain is taken sideways of the bearings.

The wheel construction illustrated in Fig. 3 is similar to that just described with the exception that a modified form of compression ring 24a of rubber, or other elastic or flexible material is substituted for the metallic ring of Figs. 1 and 2.

In Fig. 4, a slightly modified sleeve 13a is shown formed with an annular recess 26 in the bore thereof adjacent the flanged end and adapted to receive a snap ring 27 which serves as the abutment for the adjacent side of the outer race 18 of the bearing assembly. In this form of the invention, the recesses 25 hereinabove described for the reception of the prongs of a spanner ring are omitted from the outer face of the sleeve 13a. However, such recesses are formed in the outer face of the clamping nut 16.

Referring to Fig. 5, one side of the outer race 18 of the precision bearing assembly is retained by the abutment 23 formed in the sleeve 13 as heretofore described in Fig. 1; but the opposite side of said assembly is engaged by an annular nut 28 threaded to engage the interior threads 15 of the sleeve 13. The outer end face of adjusting nut 28 is formed with recesses 29 similar to the recesses 25 in the clamping nut 16, to facilitate adjustment in the sleeve. Thus, in this form of wheel construction, the bearing assembly is locked in place independently of the clamping of the outer tire 10 by the flanges 14 and 17.

The wheel construction in Fig. 6 is similar to that described in connection with Figs. 1 and 2 but includes two precision bearing assemblies generally indicated as 30 and 31, each of which is similar in all respects to the single bearing assembly heretofore described. The precision bearings 30 and 31 are paired to remove all internal clearance and to increase the bearing surface of the wheel on the axle of the roller skate, thereby increasing the smoothness of operation of the wheel. The angle of contact, or angle of pressure, in the respective bearing assemblies 30 and 31 is indicated by dot and dash lines 32 and 33. The inner races of the bearings have their adjacent abutting sides ground off slightly so that when these inner races are clamped together, the diagonal thrust line effect is provided as indicated by the lines 32, 33, which is very advantageous for use with roller skates of the type described.

In Fig. 7, the pair of precision bearing assemblies 30a and 31a are spaced from one another in the sleeve 13 by an annular spacer 34 interposed between the inner races of the bearing assemblies. Thus in this form of wheel, the bearing assemblies 30a and 31a are preloaded as indicated by the diagonal dot and dash lines 32a and 33a by virtue of the spacer 34 cooperating with the inner races of the bearing assemblies and the abutment 23 and compression ring 24 cooperating with the outer races of said assemblies.

Fig. 8 illustrates a still further modified form wherein the bearing assemblies 30b and 31b are preloaded so that the angle of contact, or angle of pressure in the respective bearing assemblies indicated by the dot and dash lines 32b and 33b is substantially the opposite to that shown in Fig. 7. In this form, the inner races of the bearing assemblies are separated by annular spacer 34 while the outer races are separated or spaced apart by a compression washer 35, preferably of rubber, so that the compression ring 24 merely serves to urge the preloaded outer races of the bearings 30b and 31b toward the abutment 23 in the sleeve 13.

It will thus be observed that with whatever form of bearing used the various parts of the wheel are held together by a pair of threaded coupling members which permit of adjustment to take care of any slack or looseness of the outer tire while at the same time the bearing or bearings are clamped endwise in position. Furthermore, in the event the tire is damaged or worn, the same can be quickly and easily replaced without requiring replacement of complete wheel assembly.

From the foregoing it is believed that the present invention may be readily understood by those skilled in the art without further description, it being borne in mind that numerous changes in the details of construction of the various parts may be made without in any way departing from the spirit of the invention as set out in the following claims.

What is claimed and desired to be secured by Letters Patent is:

1. In a wheel construction of the class described, having an annular tire formed with a pair of oppositely inclined shoulders in the bore thereof, a cylindrical sleeve in the bore of said tire, an annular flange on one end of said sleeve beveled to engage one of said pair of said inclined shoulders, the opposite end of said sleeve being threaded, a threaded adjusting member adapted to be screwed into the threaded end of said sleeve, an annular flange on said adjusting member beveled to engage the other of said pair of inclined shoulders, said annular flanges and inclined shoulders forming a dovetailed joint, a bearing assembly in said sleeve, means in said sleeve forming a fixed abutment adapted to engage one side of said bearing assembly, and flexible means interposed between the inner end of said adjusting member and the adjacent side of said bearing assembly to retain the latter in place in said sleeve.

2. In a wheel construction of the type described, the combination with an annular wooden tire formed with opposed inclined shoulders in the bore thereof, and bearings; of a pair of oppositely disposed threaded coupling members, an annular abutment in one of said coupling members engaging one side of said bearings, means interposed between the inner end of the other of said coupling members and the adjacent side of said bearings to hold said bearings in place, and an annular flange on each of said threaded members, beveled to engage a corresponding inclined shoulder on said tire to form a dovetailed joint, said threaded members being adjustable to take up any looseness of the wooden tire.

3. In a wheel construction, the combination of a coupling member including a cylindrical bored member having a threaded portion at one end and having an inner and an outer clamping abutment at the other end, a second coupling member having a threaded portion at one end and an inner and an outer clamping member at the other end thereof, a tire disposed between the outer clamping members, a bearing assembly including a pair of bearings adjacent each other disposed between the inner clamping members, a yielding but pressure-resisting member disposed between one of the inner clamping members and said bearing assembly, the compression of the outer clamping members upon the tire and the compression of the inner clamping members upon the bearing assembly being dependent upon the amount of threaded engagement between the coupling members, and means disposed between the adjacent bearings which on the compression acting upon said bearings takes up the clearances in the bearings.

4. In a wheel construction for roller skates and the like, having an annular tire formed with a pair of oppositely inclined outwardly converging shoulders in the bore thereof, a cylindrical member in the bore of said tire, an annular outwardly extending flange adjacent one end of said member and beveled to engage one of said pair of inclined shoulders and having an inwardly extending flange, the opposite end of said member being inwardly threaded, a bearing assembly in said member adapted to seat against said inwardly extending flange, a threaded adjusting nut adapted to be screwed into the threaded end of said member, an annular beveled flange integral with said adjusting nut extending over and beyond the free end of the cylindrical member and beveled to engage the other of said pair of shoulders, said beveled flanges cooperating with said inclined shoulders to form a dovetailed joint to clamp said tire in place, and flexible means acting upon the bearing assembly to hold the bearing assembly in position, said bearing assembly consisting of a pair of bearings each of which has an outer and inner ring and anti-friction means therebetween.

5. In a wheel construction for roller skates and the like, having an annular tire formed with a pair of oppositely inclined outwardly converging shoulders in the bore thereof, a cylindrical member in the bore of said tire, an annular outwardly extending flange adjacent one end of said member and beveled to engage one of said pair of inclined shoulders and having an inwardly extending flange, the opposite end of said member being inwardly threaded, a bearing assembly in said member adapted to seat against said inwardly extending flange, a threaded adjusting nut adapted to be screwed into the threaded end of said member, an annular beveled flange integral with said adjusting nut extending over and beyond the free end of the cylindrical member and beveled to engage the other of said pair of shoulders, said beveled flanges cooperating with said inclined shoulders to form a dovetailed joint to clamp said tire in place, and flexible means acting upon the bearing assembly to hold the bearing assembly in position, said bearing assembly consisting of a pair of bearings each of which has an outer and inner ring and anti-friction means therebetween, and having the outer rings of said pair spaced movably in respect to each other.

6. In a wheel construction for roller skates and the like, having an annular tire formed with a pair of oppositely inclined outwardly converging shoulders in the bore thereof, a cylindrical member in the bore of said tire, an annular outwardly extending flange adjacent one end of said member and beveled to engage one of said pair of inclined shoulders and having an inwardly extending flange, the opposite end of said member being inwardly threaded, a bearing assembly in said member adapted to seat against said inwardly extending flange, a threaded adjusting nut adapted to be screwed into the threaded end of said member, an annular beveled flange integral with said adjusting nut extending over and beyond the free end of the cylindrical member and beveled to engage the other of said pair of shoulders, said beveled flanges cooperating with said inclined shoulders to form a dovetailed joint to clamp said tire in place, and flexible means acting upon the bearing assembly to hold the bearing assembly in position, said bearing assembly consisting of a pair of bearings each of which has an outer and inner ring and anti-friction means therebetween, and having rings of said pair spaced movably in respect to each other, and a resilient member therebetween.

7. A wheel construction for roller skates and the like, comprising an annular tire formed with a pair of shoulders in the bore thereof, a cylindrical sleeve in the bore of said tire, said sleeve having an annular flange at one end thereof adapted to engage one of said pair of shoulders, flange means extending outwardly of said sleeve to engage the other of said pair of shoulders to clamp said tire, and extending within the bore to engage the sleeve and form an abutment, a second abutment in said sleeve, a bearing assembly disposed between the abutment and the flange means extending inwardly of said sleeve adjacent one side of said bearing assembly to retain the latter in place.

8. In a wheel construction, the combination of a rotating sleeve member having a bore and an internal shoulder, an outer racering within the bore and having one of its lateral faces mounted against said shoulder, a rubber washer disposed against the other lateral face of said racering, and means within said bore and engaging said sleeve for pressing said rubber washer against said racering and for holding the outer racering in position in said bore against rotation with respect to said rotatable sleeve member, whereby the rubber washer prevents shock loading and ball imprinting of the bearing race.

EUGENE F. MARTINEC.